United States Patent
Oh et al.

(10) Patent No.: US 9,650,948 B2
(45) Date of Patent: May 16, 2017

(54) APPARATUS AND METHOD OF CONTROLLING ENGINE SYSTEM

(71) Applicant: Doosan Infracore Co., Ltd., Incheon (KR)

(72) Inventors: Byoung Gul Oh, Incheon (KR); Sang Hoon Kim, Incheon (KR); Min Seok Ko, Gyeonggi-do (KR); Kyung Min Park, Gyeonggi-do (KR); Nag In Kim, Seoul (KR)

(73) Assignee: Doosan Infracore Co., Ltd., Incheon (KR)

( * ) Notice: Subject to any disclaimer, the term of this patent is extended or adjusted under 35 U.S.C. 154(b) by 121 days.

(21) Appl. No.: 14/699,099

(22) Filed: Apr. 29, 2015

(65) Prior Publication Data

US 2015/0308332 A1  Oct. 29, 2015

(30) Foreign Application Priority Data

Apr. 29, 2014 (KR) .................. 10-2014-0051696

(51) Int. Cl.
*F02B 37/24* (2006.01)
*F02D 41/00* (2006.01)
*F02D 41/14* (2006.01)

(52) U.S. Cl.
CPC .......... *F02B 37/24* (2013.01); *F02D 41/0007* (2013.01); *F02D 41/0052* (2013.01); *F02D 41/1403* (2013.01); *F02D 41/0077* (2013.01); *F02D 2041/1418* (2013.01); *F02D 2200/0614* (2013.01); *F02D 2200/101* (2013.01); *Y02T 10/144* (2013.01); *Y02T 10/47* (2013.01)

(58) Field of Classification Search
CPC .. F02B 37/24; F02D 41/0007; F02D 41/0052; F02D 41/0077; F02D 41/1403; F02D 2041/1418; F02D 2200/0614; F02D 2200/101; Y02T 10/144; Y02T 10/47
See application file for complete search history.

(56) References Cited

U.S. PATENT DOCUMENTS

| | | | |
|---|---|---|---|
| 2003/0145591 A1* | 8/2003 | Arnold | F01D 17/14 60/602 |
| 2003/0149522 A1* | 8/2003 | Arnold | F01D 17/14 701/100 |

(Continued)

*Primary Examiner* — Audrey K Bradley
(74) *Attorney, Agent, or Firm* — John D. Veldhuis-Kroeze; Westman, Champlin & Koehler, P.A.

(57) ABSTRACT

A control apparatus of an engine system, the engine system including an engine, a VGT configured to control a boost pressure applied to the engine by adjust an angle of a vane provided in a turbine, and an EGR valve configured to control an amount of a recirculated exhaust gas, includes a target value determiner determining a target boost pressure and a target intake air amount based on an engine speed and a fuel injection amount, an EGR valve controller calculating a target EGR mass flow rate based on the target boost pressure and the target intake air amount and determining an EGR valve opening rate, and a turbocharger controller performing a sliding mode control using the calculated target EGR mass flow rate as a parameter to calculate a target compressor power and a target turbocharger mass flow rate and determining a turbine vane opening rate.

7 Claims, 3 Drawing Sheets

(56) References Cited

U.S. PATENT DOCUMENTS

| | | | |
|---|---|---|---|
| 2004/0089061 A1* | 5/2004 | Matsunaga | F02D 41/0072 73/114.76 |
| 2006/0196182 A1* | 9/2006 | Kimoto | F02B 33/44 60/605.1 |
| 2007/0068159 A1* | 3/2007 | Ueno | F02D 23/00 60/605.2 |
| 2010/0089371 A1* | 4/2010 | Shibata | F02D 41/0007 123/568.16 |
| 2011/0067396 A1* | 3/2011 | Quigley | F02M 26/10 60/602 |
| 2012/0271529 A1* | 10/2012 | Kashiwagi | F02B 37/12 701/102 |

* cited by examiner

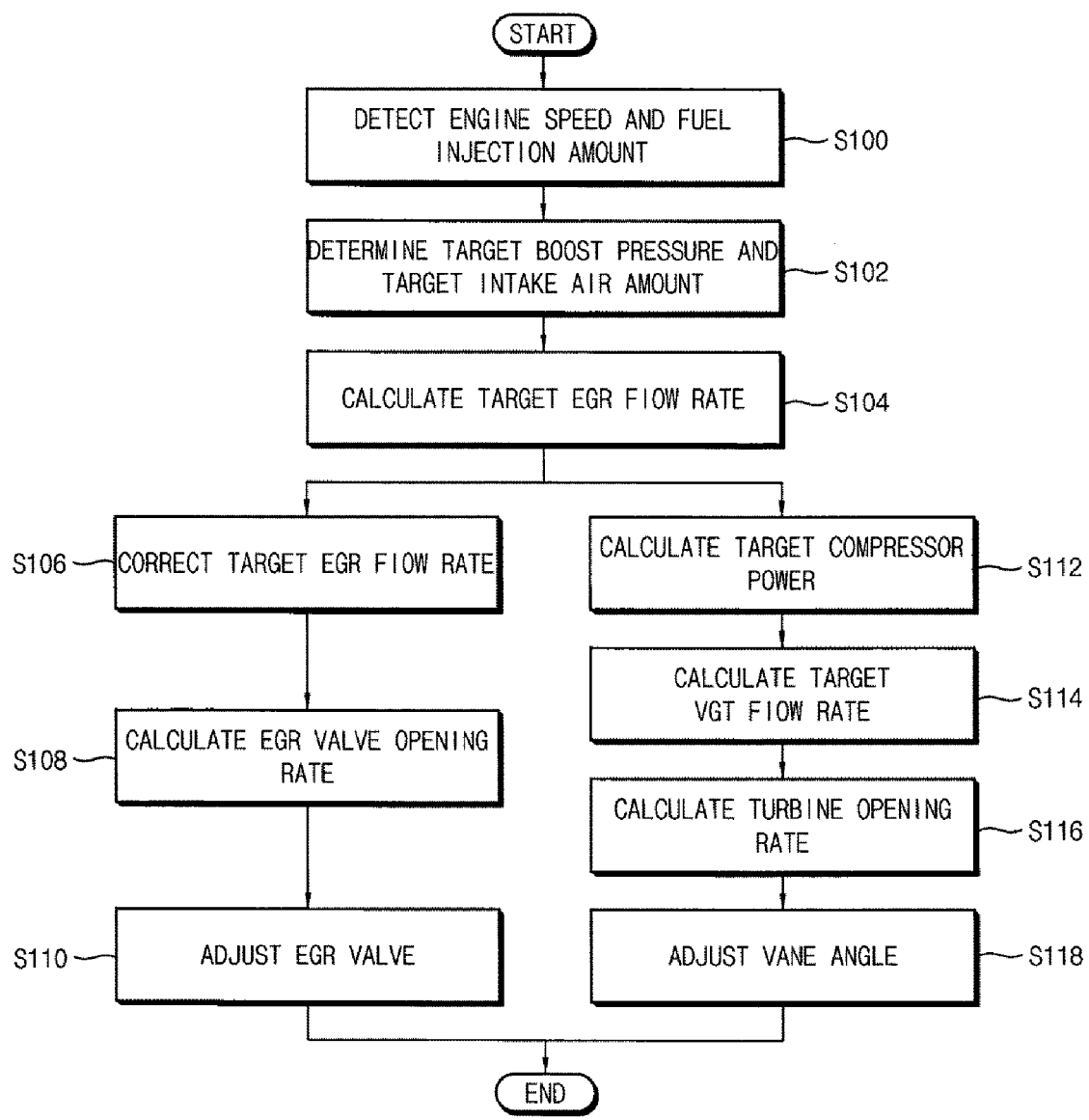

APPARATUS AND METHOD OF CONTROLLING ENGINE SYSTEM

CROSS-REFERENCE TO RELATED APPLICATION

This application claims priority under 35 USC §119 to Korean Patent Application No. 10-2014-0051696, filed on Apr. 29, 2014 in the Korean Intellectual Property Office (KIPO), the contents of which are herein incorporated by reference in their entirety.

BACKGROUND

1. Field

Example embodiments relate to an apparatus for controlling an engine system and a method of controlling the same. More particularly, example embodiments relate to an apparatus and method of controlling a boost pressure and an intake air amount in a diesel engine.

2. Description of the Related Art

Currently, diesel engines may be equipped with a variable geometry turbocharger in which a turbine is rotated by an exhaust gas flowing in an exhaust pipe and a compressor connected to the turbine via a shaft is rotated to compress an intake air, thereby perform supercharging. Also, the diesel engines may be equipped with an exhaust gas recirculation (EGR) system which recirculates a portion of the exhaust gas to a combustion chamber to efficiently reduce NOx.

In a conventional engine management system, PID (proportional integral derivative) controller dedicated to VGT (variable geometry turbocharger) and PID controller dedicated to EGR may be used independently to each other.

A conventional PID controller may have lookup tables for P, I, D gain and use optimal P, I, D gain adapted for a working situation. However, a huge number of tests may be required to obtain the optimal lookup table, to thereby increasing development periods and costs.

Further, since the variable geometry turbocharger (VGT) and the EGR system may be physically coupled to each other, a coupling effect of VGT and EGR may need to be considered together. However, a conventional controller in the diesel engine system may ignore the coupling effect and control the VGT and EGR independently, so that it may be difficult to perform a precise and accurate control, especially in a transient operation.

SUMMARY

Example embodiments provide a control apparatus of an engine system capable of reducing a controller tuning time and improving a control performance.

Example embodiments provide a method of controlling an engine system using the above control apparatus.

According to example embodiments, a control apparatus of an engine system, the engine system including an engine, a variable geometry turbocharger having a turbine and a compressor and configured to control a boost pressure applied to the engine by adjust an angle of a vane provided in the turbine, and an exhaust gas recirculation (EGR) valve configured to control an amount of an exhaust gas recirculated to the engine, includes a target value determiner determining a target boost pressure and a target intake air amount based on an engine speed and a fuel injection amount, an EGR valve controller calculating a target EGR mass flow rate based on the target boost pressure and the target intake air amount and determining an EGR valve opening rate according to the calculated target EGR mass flow rate, and a turbocharger controller performing a sliding mode control using the target EGR mass flow rate calculated based on the target boost pressure as a parameter to calculate a target compressor power and a target turbocharger mass flow rate and determining a turbine vane opening rate according to the calculated turbocharger mass flow rate.

In example embodiments, the EGR valve controller may include a target EGR flow rate calculator calculating the target EGR flow rate using an intake manifold model on the basis of the target boost pressure and the target intake air amount and an EGR valve lift calculator calculating the EGR valve opening rate according to the calculated target EGR mass flow rate.

In example embodiments, the EGR valve controller may further include an EGR flow rate corrector which corrects the calculated target EGR flow rate in consideration of environmental conditions.

In example embodiments, the turbocharger controller may include a target compressor power calculator performing a sliding mode control using a difference between the target boost pressure and a current boost pressure as a sliding control error to calculate the target compressor power, a target turbocharger flow rate calculator performing a sliding mode control using a difference between the target compressor power and a current compressor power as a sliding control error to calculate the target turbocharger mass flow rate, and a turbocharger vane position calculator calculating the turbine vane opening rate according to the target turbocharger mass flow rate.

According to example embodiments, in a method of controlling an engine system, a target boost pressure and a target intake air amount are determined based on an engine speed and a fuel injection amount. A target EGR mass flow rate is calculated based on the target boost pressure and the target intake air amount. An EGR valve opening rate is calculated according to the target EGR mass flow rate. A sliding mode control is performed using the target EGR mass flow rate calculated based on the target boost pressure as a parameter to calculate a target compressor power and a target turbocharger mass flow rate. A turbine vane opening rate is calculated according to the target turbocharger mass flow rate.

In example embodiments, the method may further include correcting the target EGR mass flow rate in consideration of environmental conditions.

In example embodiments, calculating the target compressor power and the target turbocharger mass flow rate may include performing a sliding mode control using a difference between the target boost pressure and a current boost pressure as a sliding control error to calculate the target compressor power, and performing a sliding mode control using a difference between the target compressor power and a current compressor power as a sliding control error to calculate the target turbocharger mass flow rate.

According to example embodiments, a control apparatus of an engine system may control a boost pressure and an intake air amount in a diesel engine using model based control. In an engine system including a turbocharger and an EGR system physically coupled with each other, the control apparatus may control a vane opening rate of the turbocharger in consideration of a target EGR mass flow rate. Thus, the control apparatus may reduce a controller tuning time and improve a control performance.

BRIEF DESCRIPTION OF THE DRAWINGS

Example embodiments will be more clearly understood from the following detailed description taken in conjunction with the accompanying drawings. FIGS. 1 to 3 represent non-limiting, example embodiments as described herein.

FIG. 1 is a block diagram illustrating a control apparatus of an engine system in accordance with example embodiments.

FIG. 2 is a block diagram illustrating a controller in FIG. 1.

FIG. 3 is a flow chart illustrating a method of controlling an engine system in accordance with example embodiments.

DESCRIPTION OF EMBODIMENTS

Figure 1:
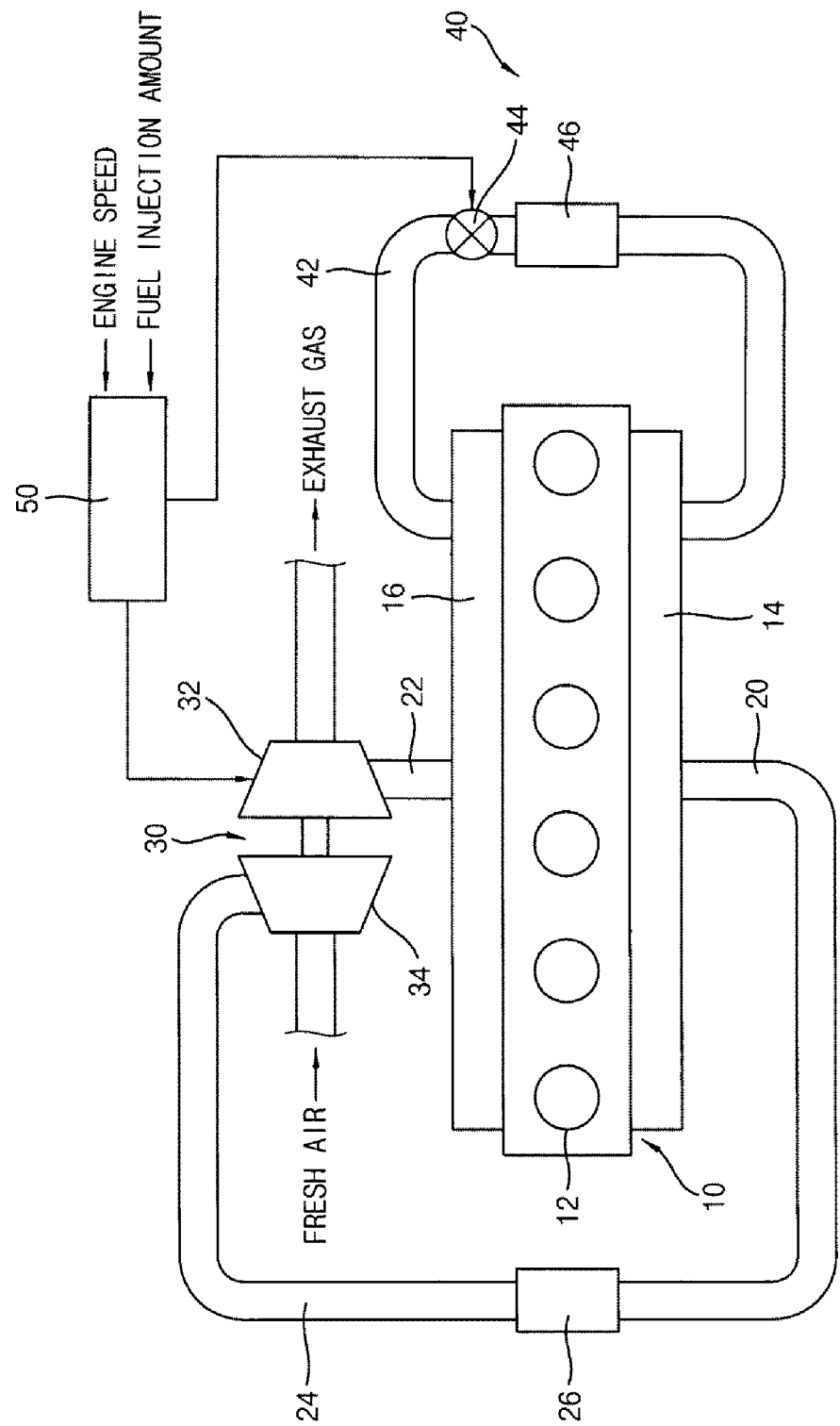

Various example embodiments will be described more fully hereinafter with reference to the accompanying drawings, in which some example embodiments are shown. The present inventive concept may, however, be embodied in many different forms and should not be construed as limited to the example embodiments set forth herein. Rather, these example embodiments are provided so that this description will be thorough and complete, and will fully convey the scope of the present inventive concept to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, fourth etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present inventive concept.

The terminology used herein is for the purpose of describing particular example embodiments only and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
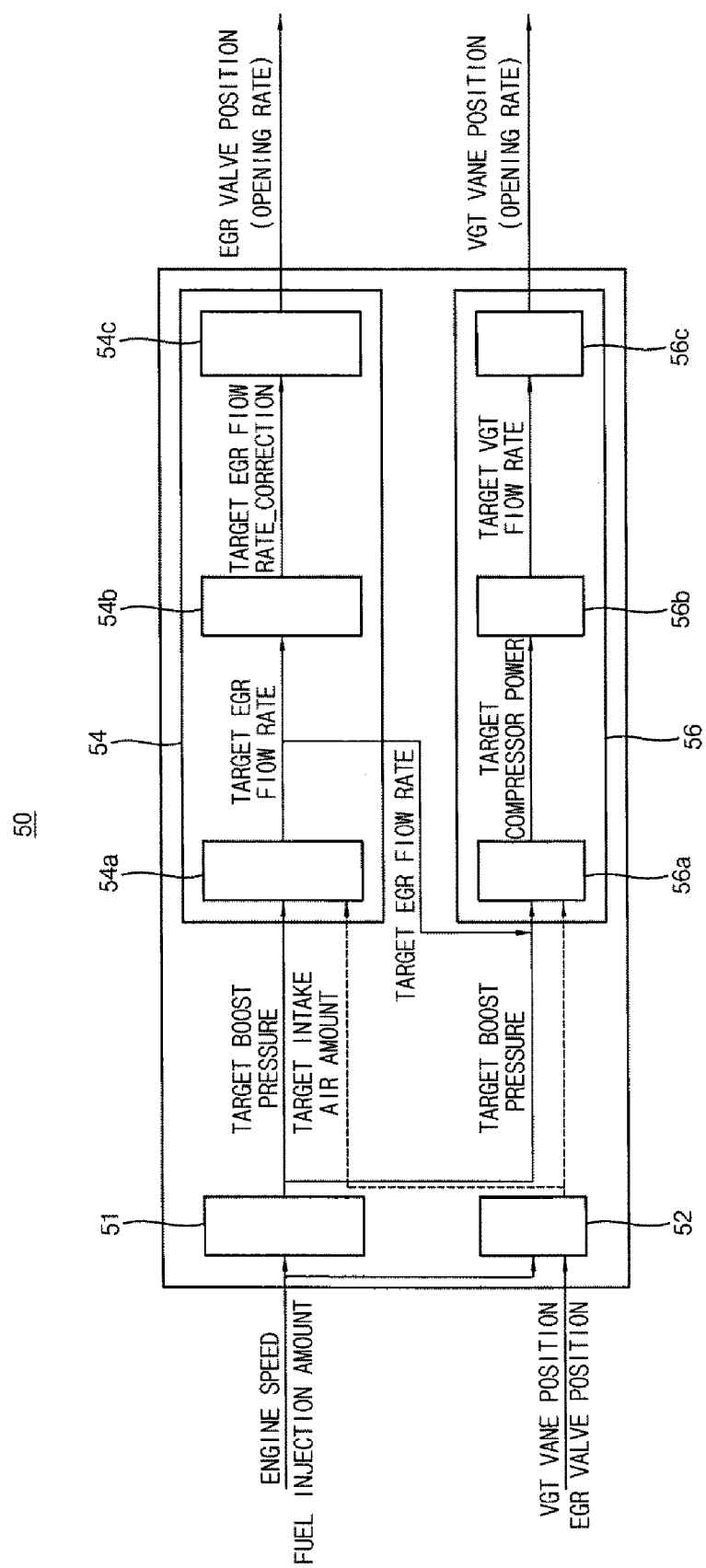

FIG. 1 is a block diagram illustrating a control apparatus of an engine system in accordance with example embodiments. FIG. 2 is a block diagram illustrating a controller in FIG. 1.

Referring to FIGS. 1 and 2, an engine system may include an internal combustion engine 10, a variable geometry turbocharger (VGT) 30 disposed between an intake pipe 20 and an exhaust pipe 22 and supercharging intake air by exhaust power, an exhaust gas recirculation system 40 configured to recirculate a part of an exhaust gas from an exhaust manifold 16 to the engine 10, and a controller 50 executing various controls of the engine system.

In example embodiments, the engine 10 may include a diesel engine as a driving source for a construction machine, for example, excavator. The engine 10 may include a plurality of cylinders 12 respectively having a combustion chamber, into which a fuel is injected by a fuel injection device (not illustrated). The intake air may be distributed to the cylinders 12 through an intake manifold 14, and the exhaust gas exhausted from the cylinders 12 may flow into the exhaust pipe 22 through the exhaust manifold 16.

The variable geometry turbocharger 30 may be connected to the exhaust manifold 16 through the exhaust pipe 22 and connected to the intake manifold 14 through the intake pipe 20. The variable geometry turbocharger 30 may supply turbocharged intake air to the intake manifold 14 and exhaust the exhaust gas from the exhaust manifold 16 to the outside.

In particular, the variable geometry turbocharger 30 may include a turbine 32 arranged in the exhaust pipe 22 and rotated by the exhaust gas flowing in the exhaust pipe 22 and a compressor 34 operated by the rotational energy of the turbine 32. The turbine 32 may be driven by a pressure of the inflowing exhaust gas, and the rotational force of the turbine 32 may be transmitted to the compressor 34 such that the compressor 34 may compress and deliver the intake air flowing in the intake pipe 20 to the intake manifold 14.

A fresh intake air may be compressed by the compressor 34 and flow into the intake manifold 14 of the engine 10 through an intake air supply pipe 24. An intercooler 26 may be installed in the intake air supply pipe 24 such that the intake air may be cooled and supplied to the intake manifold 14.

The turbine 32 of the variable geometry turbocharger 30 may include a vane. An angle of the vane (opening rate of the turbine) may be adjusted by a control signal outputted by the controller 50 to change a flow rate of the exhaust gas, thereby controlling a boost pressure applied to the engine 10.

The EGR system 40 may include an EGR line 42, an EGR valve 44 and an EGR cooler 46. A part of the exhaust gas from the exhaust manifold 16 of the engine 10 may be recirculated to the intake manifold 14 of the engine 10 through the EGR line 42. The EGR valve 44 may be installed in the EGR line 42 to control a flow rate of the recirculated exhaust gas. The EGR cooler 46 may be installed in the EGR line 42 to cool the recirculated exhaust gas.

An opening rate of the EGR valve 44 may be adjusted by a control signal outputted by the controller 50 to change a flow rate of the exhausted gas recirculated to the engine 10.

In order to properly adjust the vane opening rate of the VGT turbine 32 and the opening rate of the EGR valve 44, various detection devices and sensors may be provided in the engine system. The controller 50 may receive various measurements about operating conditions of the engine from the detection devices and sensors. For example, the controller 50 may receive output signals such as an engine speed (rpm) of the engine 10 from an engine speed sensor, an fuel injection amount from the fuel injection device, a boost pressure from an intake manifold pressure sensor, an intake manifold temperature from an intake manifold temperature sensor, an exhaust manifold pressure from an exhaust manifold pressure sensor, an exhaust manifold temperature from an exhaust manifold temperature sensor, etc.

The controller 50 may control the vane of the VGT turbine 32 and the EGR valve 44 on the basis of the output signals. As illustrated in FIG. 2, the controller 50 may include target value determiner 51, a measurement/model storage portion 52, an EGR valve controller 54 and a turbocharger controller 56.

The target value determiner 51 may determine a target boost pressure and a target intake air amount based on the engine speed and the fuel injection amount. The target value determiner 51 may calculate the target boost pressure and the target intake air amount on the basis of a lookup table using the engine speed and the fuel injection amount as input values.

The measurement/model storage portion 52 may receive and store the measurements about driving conditions of the engine from the detection devices and sensors. The measurements may be inputted to the EGR valve controller 54 and the turbocharger controller 56 and used to calculate desired target values. The measurement/model storage portion 52 may construct and store a system model such as an intake manifold model, an exhaust manifold model of the engine 10, etc. The system model may be constructed on the basis of intake and exhaust dynamics of an actual engine, and the constructed system model may be used to calculate desired target values in the EGR valve controller 54 and the turbocharger controller 56.

The EGR valve controller 54 may calculate a target EGR mass flow rate based on the target boost pressure and the target intake air amount and determine an EGR valve opening rate according to the calculated target EGR mass flow rate. In particular, the EGR valve controller 54 may include a target EGR flow rate calculator 54a, a target EGR flow rate corrector 54b and an EGR valve lift calculator 54c.

The target EGR flow rate calculator 54a may calculate the target EGR mass flow rate using the intake manifold model on the basis of the target boost pressure and the target intake air amount.

In the intake manifold model, the sum of a mass of an air flowing into the intake manifold 14 and a mass of an air exiting from the intake manifold 14 is zero in a steady state operating condition of a steady state. The law of conservation of mass in the intake manifold 14 may be expressed by following Equation (1).

$$\Sigma W = W_{ie}^d - W_{ci}^d - W_{EGR}^d = 0 \quad \text{Equation (1)}$$

Here, $W_{ie}^d$ is target cylinder intake mass flow rate, $W_{ci}^d$ is target compressor mass flow rate, and $W_{EGR}^d$ is target EGR mass flow rate.

Accordingly, the target EGR mass flow rate may be calculated using a difference of the cylinder intake mass flow rate and the target intake air amount (compressor mass flow rate) by following Equation (2).

$$W_{EGR}^d = W_{ie}^d - W_{ci}^d \quad \text{Equation (2)}$$

The target cylinder intake mass flow rate may be calculated by using speed-density method as known in the art. That is, the target cylinder intake mass flow rate may be calculated using intake manifold temperature/pressure and the engine speed by following Equation (3).

$$W_{EGR}^d = W_{ie}^d - W_{ci}^d = p_i^d \cdot \frac{N \cdot \eta_v}{120 \cdot R \cdot T_i} - W_{ci}^d \quad \text{Equation (3)}$$

Here, $P_i^d$ is target boost pressure, N is engine speed, $\eta_v$ is volumetric efficiency, R is ideal gas constant, and $T_i$ is intake manifold temperature.

In an operating condition, when the target intake air amount (fresh air) is increased abruptly, the target EGR mass flow rate may be reduced in order to supply a desired amount of a fresh air. In an operating condition, when the target boost pressure is increased abruptly, the target cylinder intake air amount may be increased according to the boost pressure increase, and consequently the target EGR mass flow rate may be increased in order to satisfy the target cylinder intake air amount.

The EGR flow rate corrector 54b may correct the calculated target EGR mass flow rate in consideration of environmental conditions. The target EGR mass flow rate may be corrected by flowing Equation (4) in order to reduce an error between the target EGR flow rate and the current EGR flow rate.

$$W_{EGR\_corr}^d = (W_{EGR}^d - W_{EGR}) \cdot P\_\text{gain} + \int [(W_{EGR}^d - W_{EGR}) \cdot I\_\text{gain}] dt \quad \text{Equation (4)}$$

Here, $W_{EGR\_corr}^d$ is corrected target EGR mass flow rate, $W_{EGR}$ is current EGR mass flow rate, P_gain is P gain value for target EGR mass flow rate correction, and I_gain is I gain value for target EGR mass flow rate correction.

As engine characteristics varies according to changes of environment conditions such as ambient temperature, ambient pressure and the like or deterioration of the engine, the error between the target EGR mass flow rate calculated by the EGR flow rate calculator 54a and the current EGR mass flow rate may be increased significantly. In this case, in order to harmonize the calculated target EGR mass flow rate with the current EGR mass flow rate, the target EGR mass flow rate may be corrected by using PI control as expressed by Equation (4). The PI control may be performed such that the corrected target EGR mass flow rate may be decreased gradually. The correction of the target EGR mass flow rate may be omitted for simplicity in consideration of the ambient conditions.

The EGR valve lift calculator 54c may calculate the EGR valve opening rate according to the calculated or corrected target EGR mass flow rate.

The EGR valve opening rate (EGR valve lift) may be one of the final output signals of the controller 50. Effective flow area (EFA) of the EGR valve 44 may be calculated using an orifice equation by following Equation (5) and the opening rate of the EGR valve may be determined from EFA on the basis of a lookup table.

$$EFA_{EGR} = \frac{W_{EGR\_corr}^d}{\frac{p_x}{\sqrt{R \cdot T_x}} \cdot (PR_{EGR})^{\frac{1}{\kappa}} \cdot \left[\frac{2\kappa}{\kappa - 1}\left(1 - PR_{EGR}^{\frac{\kappa-1}{\kappa}}\right)\right]^{\frac{1}{2}}} \quad \text{Equation (5)}$$

Here, $EFA_{EGR}$ is EGR valve effective flow area, $P_x$ is exhaust manifold pressure, $T_x$ is exhaust manifold temperature, $PR_{EGR}$ is front/rear pressure ratio of EGR valve, and $\kappa$ is specific heat ratio.

As the EGR mass flow rate and EFA are proportional to each other, as expressed in Equation (5), in an operating condition, when the target EGR mass flow rate is increased, EFA may be increased and the EGR valve lift may be increased (opened) accordingly, and when the target EGR mass flow rate is decreased, EFA may be decreased and the EGR valve lift may be decreased (closed) accordingly.

Accordingly, the EGR valve controller 54 may calculate the opening rate of the EGR valve 44 on the basis of the target boost pressure and the target intake air amount and output a control signal to the EGR valve 44. Thus, the opening rate of the EGR valve 44 may be adjusted by the control signal to control an amount of the exhaust gas recirculated to the engine 10.

The turbocharger controller 56 may perform a sliding mode control using the target EGR mass flow rate calculated based on the target boost pressure as a parameter to calculate a target compressor power and a target turbocharger mass flow rate and determine a turbine vane opening rate according to the calculated turbocharger mass flow rate. In particular, the turbocharger controller 56 may include a target compressor power calculator 56a, a target turbocharger flow rate calculator 56b and a turbocharger vane position calculator 56c.

The target compressor power calculator 56a may perform a sliding mode control using a difference between the target boost pressure and a current boost pressure as a sliding control error to calculate the target compressor power.

The difference between the current boost pressure and the target boost pressure may be defined as a sliding control error (sliding surface) $S_1$ as expressed by following Equation (6) and, a sliding mode control (SMC) algorism may be performed such that $S_1$ converges to zero.

$$S_1 = p_i - p_i^d \quad \text{Equation (6)}$$

Here, $S_1$ is control error, and $p_i$ is current boost pressure.

The SMC algorism may be expressed by following Equation (6-1)

$$\dot{S}_1 = -\frac{\eta_0}{\phi_0} S_1 \quad \text{Equation (6-1)}$$

Here, $\eta_0$ and $\Phi_0$ are a controller gain and a constant.

An SMC controller may control such that the control error $S_1$, that is, the boost pressure control error, may stay near zero.

Equation (6) may be substituted to Equation (6-1) to obtain following Equation (7), and then, following Equation (8) as dynamics equation for intake manifold pressure may be substituted to the left-hand side of Equation (7) to obtain following Equation (9).

$$\dot{p}_i - \dot{p}_i^d = -\frac{\eta_0}{\phi_0} S_1 \quad \text{Equation (7)}$$

$$\dot{p}_i = \frac{RT_i}{V_i}(W_{ci} + W_{EGR} - W_{ie}) \quad \text{Equation (8)}$$

$$\frac{RT_i}{V_i}(W_{ci} + W_{EGR} - W_{ie}) - \dot{p}_i^d = -\frac{\eta_0}{\phi_0} S_1 \quad \text{Equation (9)}$$

Here, $V_i$ is intake manifold volume.

The compressor mass flow rate and the cylinder intake mass flow rate in the left-hand side of Equation (9) may be expressed by following Equation (10) and following Equation (11) respectively, Equation (10) and Equation (11) may be substituted to Equation (9) to obtain following Equation (12), and consequently, the target compressor power may be expressed by following Equation (13).

$$W_{ci} = P_c \cdot \frac{1}{c_p T_a \frac{1}{\eta_c}\left[\left(\frac{p_i}{p_a}\right)^\mu - 1\right]} \quad \text{Equation (10)}$$

$$W_{ie} = k_i \frac{\eta_v N V_d}{120 R T_i} p_i \quad \text{Equation (11)}$$

$$\frac{RT_i}{V_i}\left(P_c \cdot \frac{1}{c_p T_a \frac{1}{\eta_c}\left[\left(\frac{p_i}{p_a}\right)^\mu - 1\right]} + W_{EGR} - k_i \frac{\eta_v N V_d}{120 R T_i} p_i\right) - \dot{p}_i^d = -\frac{\eta_0}{\phi_0} S_1 \quad \text{Equation (12)}$$

$$P_c^d = \frac{c_p T_a}{k_i \eta_c} \left(\left(\frac{p_i}{p_a}\right)^\mu - 1\right) \cdot \left(-k_1 W_{EGR}^d + k_i \frac{\eta_v N V_d}{120 R T_i} p_i^d - \frac{\eta_0 S_1}{\phi_0} + \dot{p}_i^d\right) \quad \text{Equation (13)}$$

where, $S_1 = p_i - p_i^d$ and $k_i = \frac{RT_i}{V_i}$

Here, $P_c$ is compressor power, $P_c^d$ is target compressor power, $c_p$ is specific heat at constant pressure, $T_a$ is ambient temperature, $\eta_c$ is compressor efficiency, $\mu$ is constant, $V_d$ is displacement volume, and $V_i$ is intake manifold volume.

As expressed in Equation (13), in case that the sliding control error $S_1$ is a positive number, the current boost pressure may be greater than the target boost pressure. The greater is $S_1$ (the greater is the difference between the current boost pressure and the target boost pressure), the less is the target compressor power. The target compressor power may be controlled to be decreased to reduce the supercharged amount and to reach the target boost pressure.

The target turbocharger flow rate calculator 56b may perform a sliding mode control using a difference between the target compressor power and a current compressor power as a sliding control error to calculate the target turbocharger mass flow rate.

The difference between the current compressor power and the target compressor power may be defined as a sliding control error (sliding surface) $S_2$ as expressed by following Equation (14) and, a sliding mode control (SMC) algorism may be performed such that S2 converges to zero.

$$S_2 = P_c - P_c^d \quad \text{Equation (14)}$$

Here, $S_2$ is control error.

The SMC algorism may be expressed by following Equation (15)

$$\dot{S}_2 = -\frac{\eta_1}{\phi_1} S_2 \quad \text{Equation (15)}$$

Here, $\eta_1$ and $\Phi_1$ are a controller gain and a constant.

An SMC controller may control such that the control error $S_2$, that is, the compressor power control error, may stay near zero.

Equation (14) may be substituted to Equation (15) to obtain following Equation (16), and then, following Equation (17) as dynamics equation for compressor power may be substituted to the left-hand side of Equation (16) to obtain following Equation (18).

$$\dot{P}_c = \dot{P}_c^d - \frac{\eta_1}{\phi_1} S_2 \qquad \text{Equation (16)}$$

$$\dot{P}_c = \frac{P_t \eta_m - P_c}{\tau} \qquad \text{Equation (17)}$$

$$\frac{P_t \eta_m - P_c}{\tau} = \dot{P}_c^d - \frac{\eta_1}{\phi_1} S_2 \qquad \text{Equation (18)}$$

Here, $P_t$ is turbine power, $\eta_{mm}$ is turbocharger mechanical efficiency, and $\tau$ is time constant.

The turbine power in the left-hand side of Equation (18) may be expressed by following Equation (19), and following Equation (20) representing turbine power characteristics may be substituted to the left-hand side of Equation (19) to obtain following Equation (21) which represents a turbocharger (VGT) mass flow rate required to reach the target value of the compressor power.

$$P_t \eta_m = P_c + \tau \left( \dot{P}_c^d - \frac{\eta_1}{\phi_1} S_2 \right) \qquad \text{Equation (19)}$$

$$\eta_m P_t = \eta_m W_{VGT}^d \eta_t c_p T_x \left( 1 - \left( \frac{p_a}{p_x} \right)^\mu \right) \qquad \text{Equation (20)}$$

$$W_{VGT}^d = \frac{\left( \frac{1}{\tau} P_c + \dot{P}_c^d - \frac{\eta_1 S_2}{\phi_1} \right)}{\frac{1}{\tau} \eta_m \eta_t c_p T_x \left( 1 - \left( \frac{p_a}{p_x} \right)^\mu \right)} \qquad \text{Equation (21)}$$

Here, $W_{VGT}^d$ is target VGT mass flow rate, $T_x$ is exhaust manifold temperature, $\eta_t$ is turbine efficiency, and $p_a$ is ambient pressure.

As expressed in Equation (21), in case that the current compressor power is greater than the target compressor power, that is, the sliding control error $S_2$ is a positive number, the greater is the absolute value of $S_2$, the less is the target VGT mass flow rate. When an occasion to reduce a compressor power arises, an SMC controller may control to make $S_2$ converges to zero such that the target VGT mass flow rate may be decreased to thereby reduce the compressor power.

The turbocharger vane position calculator 56c may calculate the turbine vane opening rate according to the target turbocharger mass flow rate.

The VGT vane opening rate may be one of the final output signals of the controller 50. Effective flow area (EFA) of the vane provided in the turbine 32 of the turbocharger 30 may be calculated using an orifice equation by following Equation (22) and the opening rate of the VGT vane may be determined from EFA on the basis of a lookup table.

$$EFA_{VGT} = \frac{W_{VGT}}{\frac{p_x}{\sqrt{R \cdot T_x}} \cdot (PR_{VGT})^{\frac{1}{\kappa}} \cdot \left[ \frac{2\kappa}{\kappa - 1} \left( 1 - PR_{VGT}^{\frac{\kappa-1}{\kappa}} \right) \right]^{\frac{1}{2}}} \qquad \text{Equation (22)}$$

Here, $EFA_{VGT}$ is VGT vane effective flow area, and $PR_{VGT}$ is front/rear pressure ratio of VGT vane.

As the VGT mass flow rate and EFA are proportional to each other, as expressed in Equation (22), in an operating condition, when the target VGT mass flow rate is increased, EFA may be increased and the opening rate of the VGT vane may be increased (opened) accordingly, and when the target VGT mass flow rate is decreased, EFA may be decreased and the opening rate of the VGT vane may be decreased (closed) accordingly.

Accordingly, the turbocharger controller 56 may calculate the opening rate of the VGT vane on the basis of the target boost pressure and output a control signal to the VGT vane. Thus, the opening rate of the vane disposed in the VGT turbine 32 may be adjusted by the control signal to control a boost pressure applied to the engine 10.

As mentioned above, a control apparatus of an engine system may control a boost pressure and an intake air amount in a diesel engine using model based control. In an engine system including a turbocharger and an EGR system physically coupled with each other, the control apparatus may control a vane opening rate of the turbocharger in consideration of a target EGR mass flow rate. Thus, the control apparatus may reduce a controller tuning time and improve a control performance.

Hereinafter, a method of controlling an engine system using the control apparatus of an engine system in FIG. 1 will be explained.

FIG. 3 is a flow chart illustrating a method of controlling the engine system in FIG. 1.

Referring to FIGS. 1 to 3, first, an engine speed and an amount of a fuel injected by a fuel injection device may be detected (S100), and then, a target boost pressure and a target intake air amount may be determined (S102).

The controller 50 may receive various measurements about operating conditions of the engine from various detection devices and sensors. For example, the controller 50 may receive output signals such as an engine speed (rpm) of the engine 10 from an engine speed sensor, a fuel injection amount from the fuel injection device, etc.

The target value determiner 51 may determine the target boost pressure and the target intake air amount based on the engine speed and the fuel injection amount. The target value determiner 51 may calculate the target boost pressure and the target intake air amount on the basis of a lookup table using the engine speed and the fuel injection amount as input values.

Then, a target EGR mass flow rate may be calculated based on the target boost pressure and the target intake air amount (S104).

The target EGR flow rate calculator 54a may calculate the target EGR mass flow rate using an intake manifold model on the basis of the target boost pressure and the target intake air amount. The intake manifold model may be constructed on the basis of intake dynamics of an actual engine and the like. The target EGR mass flow rate may be calculated using a difference of the cylinder intake mass flow rate and the target intake air amount (compressor mass flow rate).

In example embodiments, the target EGR mass flow rate may be corrected in consideration of environmental conditions (S106).

As engine characteristics varies according to changes of environmental conditions such as ambient temperature, ambient pressure and the like or deterioration of the engine, the error between the target EGR mass flow rate calculated by the EGR flow rate calculator Ma and the current EGR mass flow rate may be increased significantly. In this case, in order to harmonize the calculated target EGR mass flow rate with the current EGR flow rate, the target EGR mass flow rate may be corrected by a feedback control.

Then, an EGR valve opening rate may be calculated according to the calculated or corrected target EGR mass flow rate (S108), and then, an opening rate of an EGR valve may be adjusted (S110).

The EGR valve lift calculator 54c may calculate the EGR valve opening rate according to the calculated or corrected target EGR mass flow rate. The EGR valve opening rate (EGR valve lift) such as one of the final output signals may be calculated by calculating effective flow area (EFA) of the EGR valve 44 using an orifice equation and by determining the opening rate of the EGR valve from EFA on the basis of a lookup table.

The EGR valve controller 54 may calculate the opening rate of the EGR valve 44 on the basis of the target boost pressure and the target intake air amount and output a control signal to the EGR valve 44. Thus, the opening rate of the EGR valve 44 may be adjusted by the control signal to control an amount of the exhaust gas recirculated to the engine 10.

On the other hand, a sliding mode control may be performed using the target EGR mass flow rate calculated based on the target boost pressure as a parameter to calculate a target compressor power (S112), and then, a target turbocharger mass flow rate may be calculated (S114).

The target compressor power calculator 56a may perform a sliding mode control using a difference between the target boost pressure and a current boost pressure as a sliding control error to calculate the target compressor power.

The target turbocharger flow rate calculator 56b may perform a sliding mode control using a difference between the target compressor power and a current compressor power as a sliding control error to calculate the target turbocharger mass flow rate.

Then, a turbine vane opening rate may be determined according to the target turbocharger mass flow rate (S116), and then, a vane angle of the turbine may be adjusted (S118).

The turbocharger vane position calculator 56c may calculate the turbine vane opening rate according to the target turbocharger mass flow rate. The VGT vane opening rate such as one of the final output signals may be calculated by calculating effective flow area (EFA) of the vane provided in the turbine 32 of the turbocharger 30 using an orifice equation and determining the opening rate of the VGT vane from EFA on the basis of a lookup table.

The turbocharger controller 56 may calculate the opening rate of the VGT vane on the basis of the target boost pressure and output a control signal to the VGT vane. Thus, the opening rate of the vane disposed in the VGT turbine 32 may be adjusted by the control signal to control a boost pressure applied to the engine 10.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. In the claims, means-plus-function clauses are intended to cover the structures described herein as performing the recited function and not only structural equivalents but also equivalent structures. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A control apparatus of an engine system, the engine system including an engine, a variable geometry turbocharger having a turbine and a compressor and configured to control a boost pressure applied to the engine by adjusting an angle of a vane provided in the turbine, and an exhaust gas recirculation (EGR) valve configured to control an amount of an exhaust gas recirculated to the engine, the control apparatus comprising:
   an electronic controller; and
   a nontransitory computer readable medium having electronic controller configuring instructions comprising:
      an EGR valve controller configured to calculate a target EGR mass flow rate based on a target boost pressure and a target intake air amount and determine an EGR valve opening rate according to the calculated target EGR mass flow rate, and operatively connected to the EGR valve for controlling the EGR valve according to the determined EGR valve opening rate; and
      a turbocharger controller configured to perform a sliding mode control using the target EGR mass flow rate calculated based on the target boost pressure as a parameter to calculate a target compressor power and a target turbocharger mass flow rate and determine a turbine vane opening rate according to the calculated turbocharger mass flow rate, and operatively connected to the variable geometry turbocharger for adjusting the angle of the turbine vane according to the determined turbine vane opening rate,
   wherein the target boost pressure and the target intake air amount is determined based on an engine speed and a fuel injection amount.

2. The control apparatus of claim 1, wherein the electronic controller is further configured such that the turbocharger controller comprises:
   a target compressor power calculator configured to perform the sliding mode control using a difference between the target boost pressure and a current boost pressure as a sliding control error to calculate the target compressor power;
   a target turbocharger flow rate calculator configured to perform the sliding mode control using a difference between the target compressor power and a current compressor power as the sliding control error to calculate the target turbocharger mass flow rate; and
   a turbocharger vane position calculator configured to calculate the turbine vane opening rate according to the target turbocharger mass flow rate.

3. The control apparatus of claim 1, wherein the electronic controller is configured such that the EGR valve controller comprises:
   a target EGR flow rate calculator configured to calculate the target EGR flow rate using an intake manifold model on the basis of the target boost pressure and the target intake air amount; and
   an EGR valve lift calculator configured to calculate the EGR valve opening rate according to the calculated target EGR mass flow rate.

4. The control apparatus of claim 3, wherein the electronic controller is further configured such that the EGR valve controller further comprises an EGR flow rate corrector which corrects the calculated target EGR flow rate in consideration of environmental conditions.

5. A method of controlling an engine system, comprising:
   determining a target boost pressure and a target intake air amount based on an engine speed and a fuel injection amount;

calculating a target EGR mass flow rate based on the target boost pressure and the target intake air amount;

calculating an EGR valve opening rate according to the target EGR mass flow rate;

adjusting an opening rate of the EGR valve according to the calculated EGR valve opening rate;

performing a sliding mode control using the target EGR mass flow rate calculated based on the target boost pressure as a parameter to calculate a target compressor power and a target turbocharger mass flow rate;

calculating a turbine vane opening rate according to the target turbocharger mass flow rate; and adjusting an angle of the turbine vane according to the calculated turbine vane opening rate.

6. The method of claim 5, further comprising correcting the target EGR mass flow rate in consideration of environmental conditions.

7. The method of claim 5, wherein calculating the target compressor power and the target turbocharger mass flow rate comprises:

performing the sliding mode control using a difference between the target boost pressure and a current boost pressure as a sliding control error to calculate the target compressor power; and performing the sliding mode control using a difference between the target compressor power and a current compressor power as the sliding control error to calculate the target turbocharger mass flow rate.

\* \* \* \* \*